United States Patent [19]

Kobayashi et al.

[11] 4,367,812
[45] Jan. 11, 1983

[54] CONTROL APPARATUS FOR TORQUE CONVERTER DIRECT COUPLING CLUTCH IN AUTOMATIC TRANSMISSIONS

[75] Inventors: Kouzi Kobayashi, Toyota; Keizo Kobayashi, Anjo, both of Japan

[73] Assignee: Aisin-Warner Kabushiki Kaisha, Aichi, Japan

[21] Appl. No.: 178,766

[22] Filed: Aug. 18, 1980

[30] Foreign Application Priority Data

Aug. 18, 1979 [JP] Japan .................. 54-105143

[51] Int. Cl.³ .................. B60K 41/22; F16D 33/00
[52] U.S. Cl. .................. 192/3.3; 74/867
[58] Field of Search .................. 192/3.28, 3.29, 3.3, 192/3.31; 74/867, 868, 869, 752 C

[56] References Cited

U.S. PATENT DOCUMENTS

| | | | |
|---|---|---|---|
| 2,936,653 | 5/1960 | Quistgaard et al. | 74/868 X |
| 3,293,934 | 12/1966 | Schaefer et al. | 74/868 X |
| 4,090,417 | 5/1978 | Burcz et al. | 74/864 |
| 4,095,486 | 6/1978 | Ohnuma | 192/3.29 X |
| 4,271,939 | 6/1981 | Iwanaga et al. | 192/3.3 |
| 4,294,140 | 10/1981 | Iwanaga et al. | 192/3.3 X |

FOREIGN PATENT DOCUMENTS

| | | |
|---|---|---|
| 2707174 | 8/1977 | Fed. Rep. of Germany . |
| 809761 | 3/1959 | United Kingdom . |
| 851425 | 10/1960 | United Kingdom . |
| 1195970 | 6/1970 | United Kingdom . |
| 1212951 | 11/1970 | United Kingdom . |
| 1447324 | 8/1976 | United Kingdom . |

Primary Examiner—Rodney H. Bonck
Attorney, Agent, or Firm—Oblon, Fisher, Spivak, McClelland & Maier

[57] ABSTRACT

A control apparatus for a torque converter direct coupling clutch in an automatic transmission of a type which permits the shift pattern selectively to be switched over between the three forward speed shift ranges and four forward speed shift ranges according to the desire of a car driver, wherein the improved control apparatus controls the torque converter direct coupling clutch so as to be engaged at the highest speed gear ratio (shift range) in each shift pattern gear ranges.

9 Claims, 3 Drawing Figures

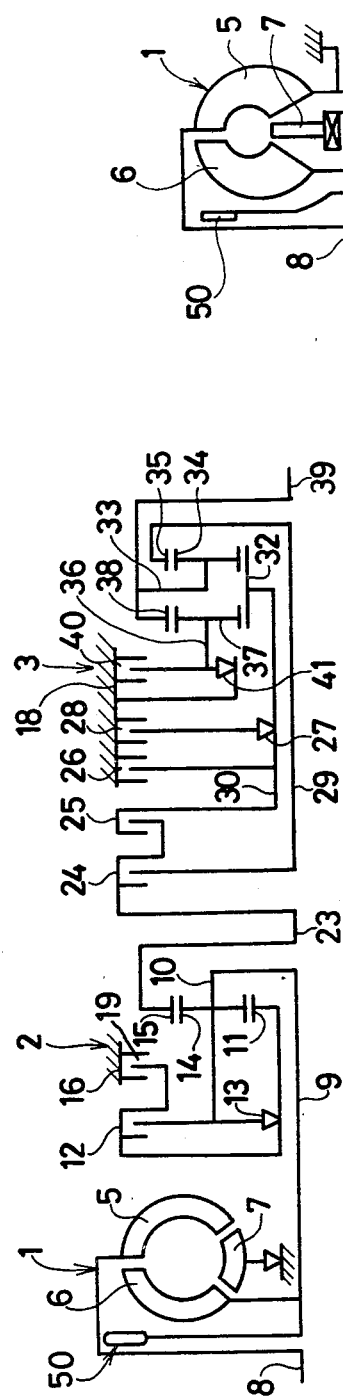
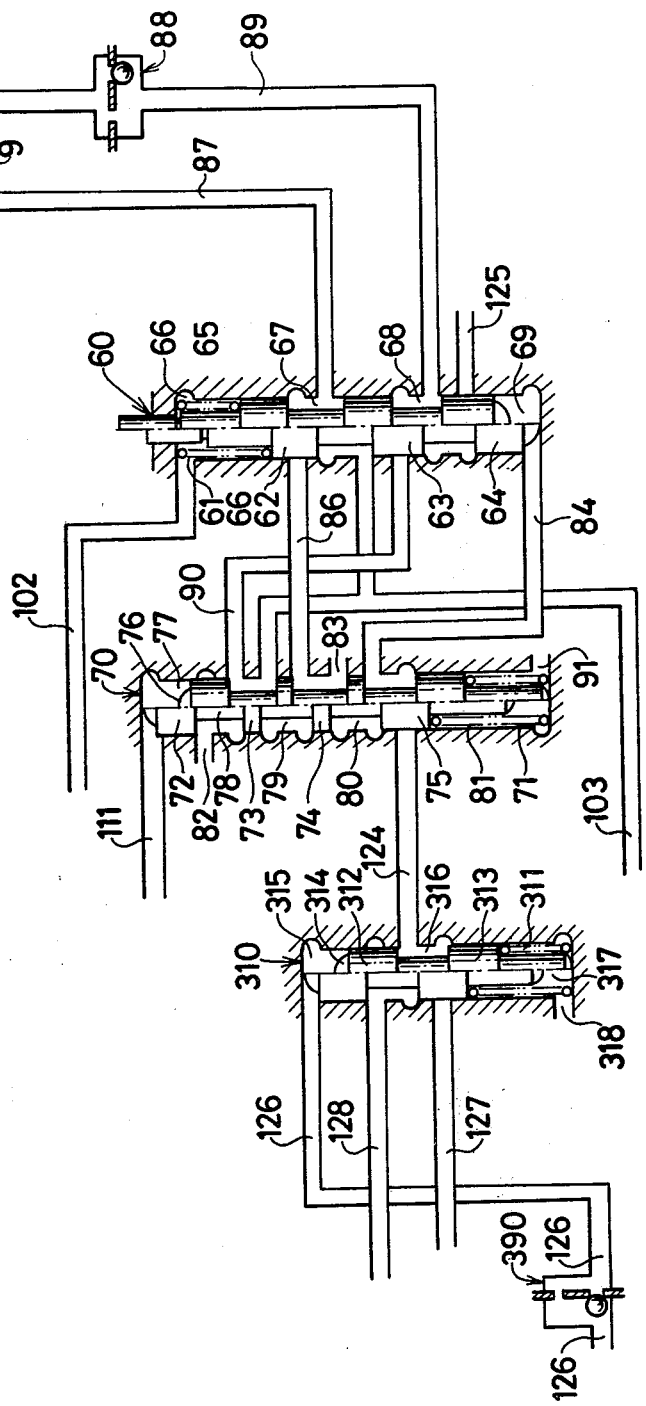
Fig.1
Fig.3

CONTROL APPARATUS FOR TORQUE CONVERTER DIRECT COUPLING CLUTCH IN AUTOMATIC TRANSMISSIONS

BACKGROUND OF THE INVENTION

The present invention relates to a control apparatus for torque converter directly coupling clutch in automatic transmissions.

There is known an automatic transmission which is so arranged as to permit a shift pattern selectively to be switched over between different speed ranges. It is also known that such prior art transmission has no clutch control means of the type disclosed herein which can improve fuel economy and car driving capabilities.

SUMMARY OF THE INVENTION

In the automatic transmission adapted to permit a selective shifting of the shift patterns, it is a principal object of the present invention to provide a control apparatus for a torque converter direct coupling clutch which is capable of engaging the direct-coupled clutch at the highest speed gear ratio (shift range) in each of the shift pattern, thereby improving both the fuel economy and driving capabilities.

BRIEF DESCRIPTION OF THE DRAWINGS

FIG. 1 is a skeleton diagram of the four forward speeds automatic transmission;

FIG. 3 is a hydraulic circuit diagram of the control apparatus for a torque converter direct coupling clutch according to the present invention.

DESCRIPTION OF THE PREFERRED EMBODIMENTS

Figure 2:
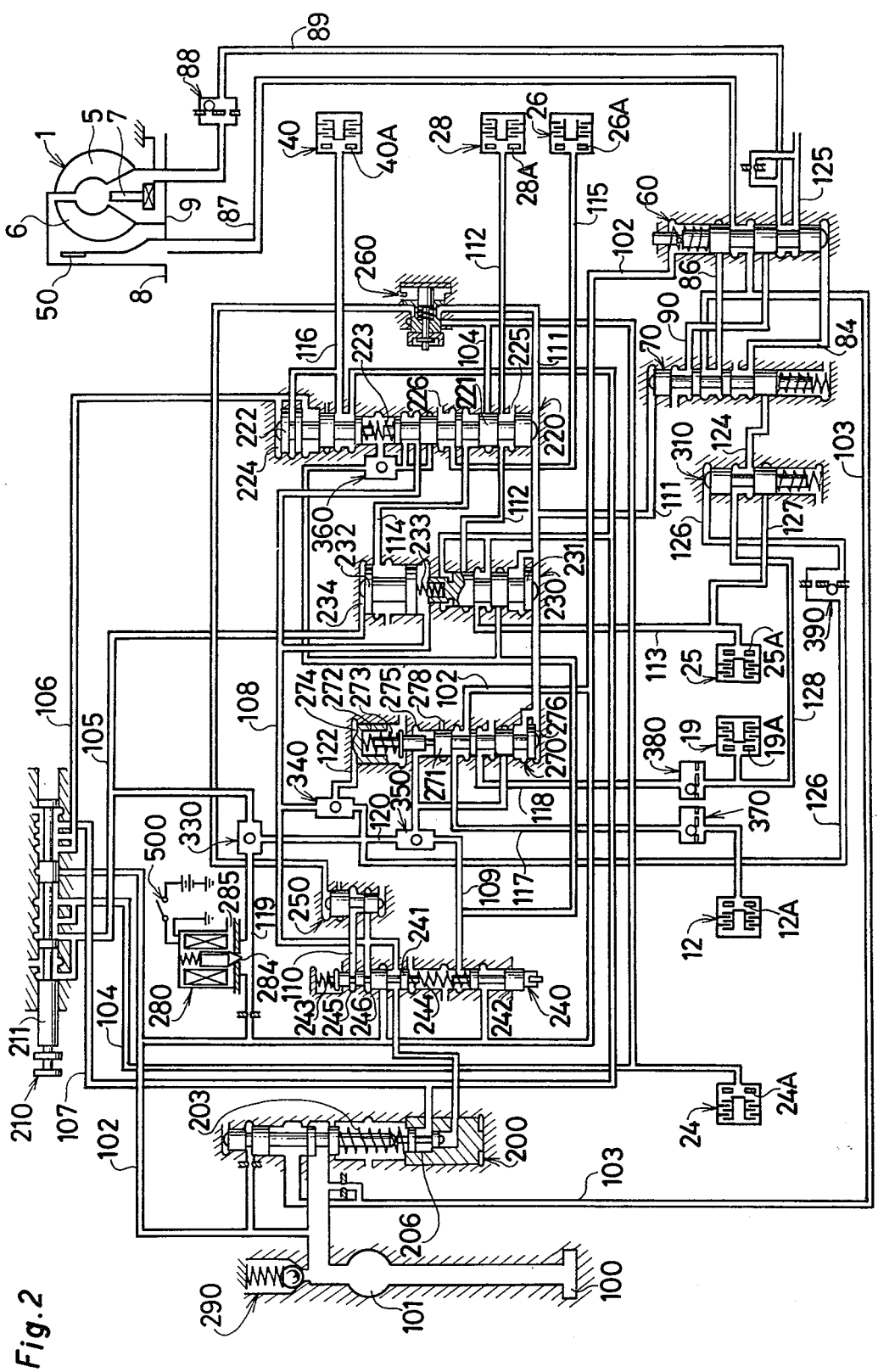
FIG. 2 is a hydraulic circuit diagram of the control apparatus in the automatic transmission.

The present invention is now described in more detail with reference to preferred embodiments thereof shown in the accompanying drawings.

In one preferred embodiment of the present invention, there is shown in FIG. 1 a four-speeds automatic transmission having an overdrive device added to the three-speeds automatic transmission. This four-speeds automatic transmission provides two shift patterns to be switched by means of the selector switch, one shift pattern giving a highest speed gear ratio in the third speed gear ratio (direct coupling gears), and the other giving a highest speed gear ratio in the fourth gear ratio (overdrive gears). In the former shift pattern, the direct-coupling clutch is engaged in the third gear ratio while in the latter shift pattern, the clutch is engaged in the fourth gear ratio. The term "direct coupling" in the present invention denotes such a coupling in a gear or clutch having a gear ratio or revolution ratio of one between input and output shafts.

FIG. 1 illustrates a gear train in the automatic transmissions equipped with a direct coupling clutch which is provided with an overdrive as the fourth speed gear ratio (range). As shown therein, the automatic transmission includes a direct coupling clutch equipped with torque converter 1, an overdrive assembly 2, and a gear shifter 3 which provides three forward and one reverse speed ranges. The torque converter 1 per se including a pump 5, a turbine 6 and a stator 7 is known one. The pump 5 is connected to an engine crankshaft 8, and the turbine 6 is connected to its shaft 9 which serves as an output shaft for the torque converter 1 as well as an input shaft for the overdrive assembly 2, the input shaft being connected to a carrier 10 on the planetary gears in the overdrive assembly 2. A direct coupling clutch 50 is interposed between the engine crankshaft 8 and the turbine shaft 9, which are mechanically connected when the clutch 50 is engaged. A planetary pinion 14 rotatably supported by the carrier 10 is in mesh with a sun gear 11 and a ring gear 15. A multi-plate clutch 12 and a one-way clutch 13 are provided between the sun gear 11 and carrier 10. A multi-plate brake 19 is mounted between the sun gear 11 and a housing having the otherwise assembly 2 therein or overdrive casing 16.

The ring gear 15 in the overdrive mechanism 2 is linked to the input shaft 23 for a gear transmission mechanism 3. A multi-plate clutch 24 is connected between the input shaft 23 and a intermediate or counter shaft 29, and another multi-plate clutch 25 is connected between the input shaft 23 and a sun gear shaft 30. Between the sun gear shaft 30 and the transmission case 18, there are provided a multi-plate brake 26, and a multi-plate brake 28 which is connected by way of a one-way clutch 27. A sun gear 32 secured to the sun gear shaft 30 forms two planetary gear trains wherein a first gear train is composed of a carrier 33, a planetary pinion 34 rotatably supported by the carrier 33 and a ring gear 35 in mesh with the pinion 34 together with the sun gear 32, and a second gear train is composed of a carrier 36, a planetary pinion 37 rotatably supported by the carrier 36 and a ring gear 38 in mesh with the pinion 37 together with the sun gear 32. The ring gear 35 in the first gear train is connected to the counter shaft 29. The carrier 33 in this (first) gear train is linked to the ring gear 38 in the second gear train, the carrier 33 and ring gear 38 being coupled with an output shaft 39. A multi-plate brake 40 and a one-way clutch 41 are provided between the carrier 36 in the second gear train and the transmission case 18. The fluidly-operated automatic transmission with the overdrive device described in the foregoing is so controlled by a hydraulic control apparatus which will be illustrated below in detail, that each clutch and each brake are engaged and/or disengaged respectively, according to the engine output torque and vehicle speed, and that the transmission is shifted through its four forward speed ranges including the overdrive (O/D), and the manually operated one reverse is shifted to.

Table 1 gives various shift gear positions and the states (engaged or disengaged) of the associated clutches and brakes.

In the above table, a symbol (O) indicates that the appropriate clutches and brakes are engaged, respectively, while a symbol (X) indicates that the appropriate clutches and brakes are disengaged, respectively.

FIGS. 2 and 3 show one application of a control apparatus for a torque converter direct coupling clutch according to the invention in the hydraulically controlled automatic transmission wherein the fourth range in the four forward speed ranges is an overdrive, and the shift pattern can selectively be switched by a car driven manually between the four speeds shift pattern which provides the highest speed range as the overdrive and the three speeds shift pattern which provides the highest speed range as a directly coupled gear train.

Referring first to FIG. 2, there is shown a hydraulic circuit diagram of one preferred embodiment of the hydraulic control apparatus for the automatic transmission. As shown therein, the hydraulic control apparatus includes an oil tank 100, an oil pump 101, a pressure regulator valve 200, a manual valve 210, a 1-2 shift valve 220, a 2-3 shift valve 230, a throttle valve 240, a cutback valve 250, a governor valve 260, an overdrive shift valve 270, a solenoid valve 280, a relief valve 290, a lock-up valve 310 provided according to the invention, a lock-up control valve 70, a switch valve 60, check valves 330, 340, 350, 360, 370, 380, 390 and 88, each having an orifice and a check ball, hydraulic power cylinders 12A, 24A, 25A, 19A, 26A, 28A and 40A which function as hydraulic power system and cause the clutches 12, 24, 25 and the brakes 19, 26, 28, 40 to operate, and hydraulic lines which interconnect the above-mentioned valves and hydraulic power cylinders.

pressure is not to be supplied to any of the lines indicated by this sign. Each position to be assumed by the shift lever represents the following corresponding operation of the transmission, i.e., R position corresponds to reverse, N position to neutral, D position to automatic shifting in four forward speed ranges, 2 position to automatic shifting between the first and second speed ranges, and L position to locked position to the forward first speed range.

Shifting the manual lever to D position causes the line pressure to be introduced into the hydraulic cylinder 24A through oil line 104, thus maintaining the clutch 24 to be placed in its engaged position. Shifting to a first, second or third forward speed causes the clutch 12 to be engaged. The oil line 104 leads the line pressure to the

TABLE 1

| Friction engagning elements Shift position | | | Clutch 12 | Clutch 24 | Clutch 25 | Brake 19 | Brake 26 | Brake 28 | Brake 40 | One-way clutch 13 | One-way clutch 27 | One-way clutch 41 |
|---|---|---|---|---|---|---|---|---|---|---|---|---|
| Parking | | | o | x | x | x | x | x | o | | | |
| Reverse | | | o | x | o | x | x | x | o | lock | overrun | lock |
| Neutral | | | o | x | x | x | x | x | x | | | |
| | | 1st | o | o | x | x | x | x | x | lock | lock | lock |
| | D-range | 2nd | o | o | x | x | x | o | x | lock | lock | overrun |
| | | 3rd | o | o | o | x | x | o | x | lock | overrun | overrun |
| Forward | | O.D | x | o | o | o | x | o | x | overrun | overrun | overrun |
| | 2-range | 1st | o | o | x | x | x | x | x | lock | lock | lock |
| | | 2nd | o | o | x | x | o | o | x | lock | lock | overrun |
| | L-range | | o | o | x | x | x | x | o | lock | lock | lock |

The operation of the hydraulic control apparatus is described for a better understanding of the construction and functions thereof.

The oil pump 101 supplies an operating hydraulic pressure for the hydraulic control apparatus, an operating oil for the torque converter 1, and a lubricating oil for all mechanically operated parts. When it is directly driven by the engine, the pump 101 takes in the oil from the oil tank 100 and feed it out to a hydraulic line 102. The hydraulic pressure in this hydraulic line 102 is called a line pressure, serving as a source of all hydraulic pressures to be supplied to the various hydraulically operated parts. The line pressure is regulated by the regulator valve 200 to a predetermined pressure level as described later. The relief valve 290 is actuated in response to an abnormal rise in the line pressure so that the line pressure can be released therethrough. The line pressure through the regulator valve 200 is then supplied to the torque converter 1 and the various parts to be lubricated by way of an oil line 103. The manual valve 210 has a spool 211 being operated by means of the operation lever located at the driver's seat. The manual valve 210 selectively supplies the line pressure in the hydraulic line 102 to an oil line 104, 105, 106, and/or 107, depending upon the selected shift lever positions as shown in Table 2.

TABLE 2

| Selected Positions | line 104 | line 105 | line 106 | line 107 |
|---|---|---|---|---|
| R Position | — | — | o | o |
| N Position | — | — | — | — |
| D Position | o | — | — | — |
| 2 Position | o | o | — | — |
| L Position | o | o | o | — |

In the above table, a symbol (o) indicates that the line pressure is to be supplied to the appropriate oil line or lines when the pertinent shift lever position is selected. Similarly, a dash (—) symbol indicates that the line 1-2 shift valve 220 and the governor valve 260. The 1-2 shift valve 220 includes spools 221 and 222, and a spring 223 mounted therebetween. In the first speed range ("speed" hereinafter), the spool 221 is placed in its lower position in FIG. 2 closing the valve 220 so that it cannot supply the hydraulic pressure in the line 104 to any parts. Shifting to the second, third or fourth speed then places the spool 221 under the governor pressure from the oil line 111, moving the spool 221 to its upper position in the drawing so that it allows the hydraulic oil in the oil line 104 to be introduced into the oil line ("line" hereinafter) 112. The line 112 leads to the 2-3 shift valve 230 and also leads to the hydraulic cylinder 28A for the brake 28. The hydraulic oil in the line 112 causes the hydraulic cylinder 28A to operate, thus actuating the brake 28 for the braking action. When the brake 28 is thus actuated, the power transmissions system provides the second speed as shown in Table 1. The 2-3 shift valve 230 contains spools 231 and 232, and a spring 233 disposed therebetween. Shifting to the first or second speed moves the spool 231 to its lower position in the drawing, and shifting to the third or fourth speed moves the spool 231 to its upper position in the drawing under the governor pressure from the line 111, allowing the hydraulic oil in the line 112 to flow into the line 113, from which the hydraulic oil is introduced into the hydraulic cylinder 25A for the clutch 25 so that it is actuated to its engaged position. Engaging the clutch 25 causes the power transmission system to provide the third speed as shown in Table 1.

The overdrive shift valve 270 includes a spool 271 a sleeve 272, a spring 273 between the spool 271 and sleeve 272, and oil chambers 274, 275 and 276. The line 102 is switched for connection to oil line 117 or 118, depending upon the oil pressure which acts upon the oil chamber 274, 275 or 276. The solenoid valve 280 is operated under the control of of an overdrive selector switch 500 at the driver's seat. Placing this selector switch 500 to OFF closes the open port 284 of the solenoid valve 280. Thus, the hydraulic oil through the line 102 is introduced into the oil chamber 274 of the overdrive shift valve 270 by way of the line 119, check valve 330, line 120, check valve 340 and oil line 122, thereby keeping the spools 271 and 272 in their lower positions in the drawing.

Changing the selector switch 500 to ON position opens the port 284, allowing the hydraulic oil in the oil chamber 274 to flow through the line 122, check valve 340, line 120, check valve 330, line 119 and open port 284, and to be drained through a drain port 285. The oil chamber 274 is supplied with a throttle pressure from the line 108 and through the check valve 340 and line 122, and the oil chamber 276 is supplied with a governor pressure from the line 111. The spool 271 is controlled depending upon the levels of the two pressures, as described hereinbelow.

With the overdrive selector switch 500 in OFF position, the line pressure in the line 102 is acting on the oil chamber 274 in the overdrive shift valve 270, thus keeping the spools 271 and 272 in their lower position in the drawing so that the hydraulic oil in the line 102 can be introduced through the line 117 and check valve 370 into the hydraulic cylinder 12A for the clutch 12 which is thus engaged.

With the selector switch 500 in ON position, a throttle pressure from the line 108 is acting on the oil chamber 274 in the overdrive shift valve 270, and the spool 271 in the overdrive shift valve 270 is thus controlled by the above acting hydraulic pressures in the oil chambers 274 and 276, in the following manner. When shifting is done to either of the first, second and third speeds in which shifting a lower governor pressure is provided, the spool 271 is placed in its lower position in the drawing, allowing the hydraulic oil in the line 102 to flow through line 117 and check valve 370 into the hydraulic cylinder 12A which then actuates the clutch 12 for engagement.

An increasing governor pressure causes the spool 271 to be moved to its upper position in the drawing, allowing the line 117 to connect the drain port 278 and thus releasing the engaged clutch 12, while allowing the hydraulic oil in the oil line 102 to be introduced by way of line 118 and check valve 380 into the hydraulic cylinder 19A for the brake 19. The brake 19 is thus actuated for engagement, shifting to the fourth speed (overdrive). With the overdrive selector switch 500 OFF, furthermore, a hydraulic pressure is supplied to the line 126 through the lines 119 and 120, and a spool 314 in the lock-up valve 310 is thus maintained in its lower position in the drawing under the action of the hydraulic pressure which is exerted on a land 312 on the spool 314, allowing the line 124 to connect to the line 127 and oil chamber 316 leading to the hydraulic power cylinder 25A which actuates the clutch 25 in a third speed.

Shifting the shift control lever to 2 position causes the line pressure to be supplied to lines 104 and 105. The hydraulic oil in the line 105 is introduced into the oil chamber 234 in the 2-3 shift valve 230, holding the spools 231 and 232 therein in their lower positions in the drawing. The line pressure is also introduced into the oil chamber 274 of the overdrive shift valve 270 by way of the check valve 330, line 120, check valve 340 and line 122, holding the spool 271 and sleeve 272 in their lower positions. The hydraulic oil in the line 104 is introduced into both the hydraulic cylinder 24A for the clutch 24 and the 1-2 shift valve 220. When the 1-2 shift valve 220 is not placed in a first speed condition, the spool 221 is placed in its upper position in the drawing, allowing the hydraulic oil in the line 104 to be supplied to the hydraulic cylinder 28A through the line 112, which actuates the brake 28. Engaging the clutches 24, 12 and brakes 26, 28 causes the power transmissions mechanism to provide a second speed. When the 1-2 shift valve 220 changes to a first speed conditions, the spool 221 is moved to its lower position in the drawing, allowing the line 112 to be connected to the drain port 225 and thus permitting the hydraulic oil in the hydraulic cylinder 28A to be withdrawn thereby releasing the brake 28 and flow through the line 112 to the drain port 225 from which the oil is drained. At the same time, the line 115 is allowed to connect to the drain port 226, so that the hydraulic oil in the hydraulic cylinder 26A is discharged through the drain port 226, releasing the brake 26 and thus causing the power transmission system to provide a first speed.

Setting the manual valve to L position causes the line pressure to be introduced into the lines 104, 105 and 106. The hydraulic oil in the line 104 actuates the clutch 24 as earlier described with respect to the D position which provides four forward speeds. The hydraulic oil in the line 105 is supplied to the oil chamber 234, holding the spools 231 and 232 of the 2-3 shift valve 230 in their lower positions, and as described above holding a spool 271 and sleeve 272 of the overdrive shift valve 270 in their lower positions. The hydraulic oil in the line 106 is introduced into the oil chamber 224 of the 1-2 shift valve 220, holding the spools 221 and 222 in the lower positions. The hydraulic oil in the line 106 is also introduced through a line 116 into a hydraulic cylinder 40A, which actuates the brake 40 for engagement. With the clutches 24, 12 and brake 40 engaged as described above, the power transmission system provides the first speed as shown in Table 1.

Shifting to R position introduces the line pressure into the lines 106 and 107. The hydraulic oil in the line 107 is then introduced into a oil chamber 206 in the pressure regulator valve 200 which is actuated to provide a higher line pressure in response to the introduced hydraulic oil. The same hydraulic oil is also introduced through the 2-3 shift valve into the line 113, which actuates the clutch 25 to be engaged. The hydraulic oil in the line 107 is introduced through the 1-2 shift valve 220 into the line 116, which actuates the brake 40 to be engaged. The clutch 12 is also operated for engagement since there is a line pressure from the hydraulic line 102. As those clutches 25, 12 and brake 40 are thus engaged, the power transmissions system provides a reverse as shown in Table 1.

The governor valve 260 is connected to an output shaft 39 shown in FIG. 1, and provides a hydraulic pressure output (governor pressure) in the hydraulic line 111 when an equilibrium is reached among the centrifugal force, the spring force of the hydraulic pressure, the output varying as a function of the number of revolutions of the output shaft or rising with the increasing number of revolutions of the output shaft.

The throttle valve 240 includes a spool 241, a downshift plug 242, springs 243 and 244 disposed therebetween, and oil chambers 245 and 246, and provides a throttle pressure output in a line 108 which varies in proportion to the throttle position, when an equilibrium is reached between the force of the spring 244 caused by the movement of the down-shift plug 242 operatively associated with the movement of the accelerator pedal, and the hydraulic pressure acting upon the oil chambers 245 and 246. The throttle pressure in the line 108 is applied to the 1-2 shift valve 220, 2-3 shift valve 230 and overdrive shift valve 270 in order to control the timing of the shifts depending on the engine load conditions. When a kick-down is required, depressing the accelerator pedal energetically causes the down-shift plug 242 to be moved upwardly, allowing the line 102 to connect to a hydraulic line 109. Thus, the line pressure in the line 102 is introduced through the line 109 and further through the 1-2 shift valve 220, 2-3 shift valve 230 and check valve 350 into the overdrive shift valve 270, and the down-shifting is done from a fourth to third speed, from a third to second speed, or from a second to first speed, depending on an equlibrium condition between the line pressure and the governor pressure acting on the lower ends of the spools 221, 231 and 271.

The cutback valve 250 provides a cutback pressure output in a line 110 when an equilibrium is reached with the hydraulic pressure. The cutback pressure in the line 110 acts upon the throttle valve 240 to reduce the throttle pressure so that it can prevent any undesired power loss that may occur due to the oil pump.

The pressure regulator valve 200 produces output of the line pressure in the line 102 when an equilibrium is reached between the hydraulic pressure and the force of the spring 203.

FIG. 3 illustrates essential elements for the embodiment of the torque converter direct coupling clutch according to the present invention, which includes the above-described solenoid valve 280, a switch valve 60, a lock-up control valve 70, a lock-up valve 310 and a check valve 390. The switch valve 60 includes a spool 65 bached by a spring 61 at the upper position in the drawing and having lands 62, 63 and 64; and upper oil chamber 66 to which the line pressure from the hydraulic source is applied via the line 102 so that the line pressure is exerted on the land 62; an oil chamber 67 defined between the lands 62 and 63, which oil chamber 67 normally connects to the hydraulic line 87 for releasing the direct coupling clutch, on the one hand the oil chamber 67 being allowed to connect through a line 86 to the oil chamber 79 in the lock-up control valve as described hereinafter, when the spool 65 is in its upper position in (in the drawing, hereinafter), while, on the other hand, the oil chamber 67 being allowed to connect to the line 103 which supplies the hydraulic pressure from the hydraulic source to the torque converter 1 when the spool 65 is placed in its lower position; an oil chamber 68 normally connecting to the line 89 for engaging the direct coupling clutch but being allowed to connect through a line 90 to an oil chamber 78 in the lock-up control valve as later described when the spool 65 is placed in its upper position and being allowed to connect through a line 125 to a hydraulic oil cooler (not shown) when the spool is in its lower position in the drawing; and a lower oil chamber 69 connected to a hydraulic power cylinder in the hydraulic control circuit to which a hydraulic pressure is to be applied under the running conditions of the vehicle wherein the directly coupled clutch is to be engaged through the lockup control valve 70 and a line 84 (e.g., at the maximum constant speed during the overdrive). The lockup control valve 70 includes a spool 76 backed by a spring 71 at the lower position in the drawing and having four lands 72, 73, 74 and 75, and upper oil chamber 77 having a supply of a governor pressure to be exerted on the land 72 through the line 111, an oil chamber 78 normally connected to the line 90 but allowed to connect to a drain port 82 when the spool 76 assumes its upper position in the drawing and allowed to connect to the hydraulic line 103 when the spool 76 takes its lower position in the drawing, an oil chamber 79 normally connected to the hydraulic line 86 but permitted to connect to the line 103 when the spool 76 is placed in its upper position and allowed to connect to a drain port 83 when the spool 76 is placed in its lower position, an oil chamber 80 normally connected to the line 80 but allowed to connect to the drain port 83 when the spool 76 is placed in its upper position in the drawing, and when the spool 76 is placed in its lower position, a chamber 80 being allowed to connect to the hydraulic power cylinder which will be operated when a shift is done to a speed which causes the direct coupling clutch to be engaged through the line 124, and a lower oil chamber 81 connected to a drain port 91.

The lockup valve 310 includes a spool 314 backed by a spring 311 on one side thereof and having lands 312 and 313; an upper oil chamber 315 to which a hydraulic pressure is to be applied through the line 126 in a given shift pattern manually selected by the car driven; an oil chamber 316 which causes the spool 314 on the one hand to be placed at its upper position when a four-speeds shift pattern including overdrive is selected, allowing a connection to be made between a line 128 leading to the hydraulic power cylinder to which the hydraulic oil is to be applied when shifted to overdrive, and which on the other hand causes the spool 314 to be placed in its lower position when a three-speeds shift pattern without overdrive is selected, allowing the line 127 leading to the hydraulic power cylinder, to which a hydraulic pressure is applied when a shifting to the third speed range is done, to connect to the hydraulic line 124; and a lower oil chamber 317 connecting to a drain port 318.

A description is next made of the manner in which the embodiment of the torque converter direct coupling clutch as described in the foregoing is operated in the automatic transmission control apparatus.

Under high-speed running conditions in which a governor pressure of over a set valve is provided so long as a shift pattern including overdrive is selected, a shifting is automatically done to the fourth speed, causing the hydraulic oil in the hydraulic power cylinder to which the hydraulic oil is applied when the overdrive is set, to be introduced into the oil chamber 316 through the line 128 connected to the above hydraulic power cylinder. Under the above condition, the lockup valve 310 has its spool 314 placed in the upper position, the lockup control valve 70 has its spool 76 placed in the lower position by causing the spring 71 to be compressed by the governor pressure in the oil chamber 77, and the switch valve 60 has its spool 65 placed in the upper position by the spring 61 which is compressed by the hydraulic pressure introduced through lines 128, 124 and 84 in that order. At this time, the hydraulic pressure is supplied in a sequence of lines 103, 90 and 89, torque converter 1 and line 87, allowing the clutch 50 directly to be coupled to the torque converter 1. When the governor pressure is reduced to below the set value, the spool 76 in the lockup control valve 70 is then urged to move to its upper position in the drawing by the action of the spring 71, stopping the supply of the hydraulic oil to the line 84 and thus causing the spool 65 in the switch valve 60 to be moved to its lower position. This allows the hydraulic oil to be supplied through lines 103, 87, torque converter 1 and oil line 89 in that order, causing the direct coupling clutch 50 to be released.

When the driver manually actuates the electro-magnetic valve located at an appropriate position in the hydraulic control circuit to select the three-speeds shift pattern without overdrive, so that a hydraulic pressure is produced in the line 126, the lockup valve 310 has its spool 314 placed in its lower position by the action of the hydraulic pressure in the oil chamber 315, and when the transmission has shifted to the third speed, the hydraulic oil in the particular hydraulic power cylinder which is required to shifting to the third speed is supplied from the line 127 to the line 124. When the vehicle is running at a higher speed above a certain speed wherein the governor pressure level stands above the set valve, the spool 76 in the lockup control valve 70 is placed in its lower position in the drawing by the action of the governor pressure, and the spool 65 in the switch valve 60 is held in its upper position in the drawing by the hydraulic pressure applied through lines 124 and 84 to the oil chamber 69. In this case, the hydraulic pressure flows through the lines 103, 90, 89, the torque converter 1 and the line 87 in that order as in the case of the overdrive, so that the direct coupling clutch is in its engaged condition. When the vehicle is running at a lower speed with the governor pressure level below the set valve, the spool 76 in the lockup control valve is placed in its lower position, and the spool 65 in the switch valve 60 is placed in its lower position due to lack in the hydraulic pressure supply to the line 84. In this case, the hydraulic pressure is supplied through the hydraulic lines 103, 87, the torque converter 1, and the line 89 in that order, causing the clutch 50 to be released.

In accordance with the preferred embodiment of the control apparatus for torque converter direct coupling clutch for use in the automatic transmission hydraulic control circuit whose construction and operation have been described hereinabove, the switch valve 60 has its upper oil chamber 66 connected to the line 102 for allowing the line pressure to be applied to the chamber, the lockup control valve 70 has its upper oil chamber 77 connected through the line 111 to the output of the governor valve 260, and has its oil chamber 80 connected through the line 124 and lockup valve 310 to the hydraulic power cylinder for the clutch 25 to which a hydraulic pressure is applied when a shifting is done to a third speed or to the hydraulic power cylinder for the brake 19 to which the hydraulic pressure is applied when a shifting is done to an overdrive.

It is advantageously possible to control the timing of the shifting and thereby to reduce any possible shocks that may occur when the transmission shifts through its entire gear range, by means of a check ball-equipped orifice 390 provided in the line 126 leading to the lockup valve. This shift timing control is accomplished by delaying the supply of the hydraulic oil to the oil chamber 315 in the lockup valve when a downshifting is done from a fourth to a third speed so that upon completion of the above downshifting, the spool 314 is brought to its lower position to allow a connection to be established between the lines 128 and 124, and by causing a rapid reduction in the hydraulic pressure in the oil chamber 315 when a upshifting occurs from a third to fourth speed, so that the spool is moved to its upper position prior to a completion of the upshifting, to allow the lines 128 and 124 to be disconnected.

Although the invention has been described with reference to the embodiments thereof shown in the drawings, it should be understood that various changes and modifications may be made within the spirit and scope of the present invention.

What we claim is:

1. A control apparatus for torque converter direct coupling clutch for the automatic transmission of the type including a torque converter to which a direct coupling clutch is disconnectably to be direct-coupled and a gear transmission having a plurality of friction engaging elements for providing a plurality of shift ranges comprising;
    (a) maximum speed shift range selector means for selectively providing any desired maximum speed shift range according to the vehicle driver,
    (b) switch valve means for switching over between a connection from a hydraulic power source to a hydraulic line for engaging the direct coupling clutch and a connection from the hydraulic power source to a hydraulic line for releasing the direct coupling clutch; and
    (c) lockup valve means for providing a hydraulic pressure output which enables the switch valve means to connect between the hydraulic power source and the hydraulic line for engaging the direct coupling clutch, the lockup valve means being adapted only to provide its output in each of the maximum speed shift ranges selected by the vehicle driver.

2. A control apparatus as defined in claim 1, wherein said lockup valve means is actuated for switching to any desired maximum speed shift range by a hydraulic pressure supplied thereinto under the control of solenoid valve means in the hydraulic circuit.

3. A control apparatus as defined in claim 2, wherein said solenoid valve means is actuated by a manual switch at the driver's seat.

4. A control apparatus as defined in claim 2, wherein said lockup valve means is supplied with a hydraulic pressure controlled by the solenoid valve means via a check-ball equipped orifice.

5. A control apparatus as defined in claim 1, wherein said lockup valve means normally provides a hydraulic pressure output which is introduced into the hydraulic power cylinder for accomplishing the shifting to the overdrive gears, and when the maximum speed shift range is switched to the direct coupling gears, a switch signal is applied to said lockup valve means for causing said lockup valve means to provide a hydraulic pressure which is introduced into the hydraulic power cylinder for accomplishing the direct coupling gears.

6. A control apparatus as defined in claim 1, further including lockup control valve means disposed between the lockup valve means and the switch valve means, said lockup control valve means being actuated by a hydraulic pressure which is introduced thereinto according to the vehicle's running conditions such that said lockup control valve means provides output for the switch valve means when said hydraulic pressure level is above a predetermined level and does not provide output for the switch valve means when the hydraulic pressure level is below said predetermined level.

7. A control apparatus as defined in claim 6, wherein said lockup control valve means cooperates with the switch valve means for switching a hydraulic line through which a hydraulic oil from the hydraulic power source is to be introduced through the switch valve means into the torque converter.

8. A control apparatus as defined in claim 6, wherein said hydraulic pressure introduced into the lockup control valve means is a governor pressure.

9. A control apparatus as defined in claim 1, wherein said selectable maximum speed shift ranges are an overdrive and direct coupling gears.

* * * * *